United States Patent
Takahashi (10) Patent No.: US 7,304,665 B2
(45) Date of Patent: Dec. 4, 2007

(54) IMAGE TRANSFER SYSTEM AND DISPLAY METHOD IN WHICH A STORED IMAGE IS TRANSFERRED TO AN IMAGE DISPLAY DEVICE

(75) Inventor: Takumi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 10/098,545

(22) Filed: Mar. 18, 2002

(65) Prior Publication Data

US 2002/0137529 A1  Sep. 26, 2002

(30) Foreign Application Priority Data

Mar. 21, 2001  (JP) ............................ 2001-081232

(51) Int. Cl.
*H04N 5/225* (2006.01)
(52) U.S. Cl. ................................. 348/207.99
(58) Field of Classification Search ................ 455/457, 455/458; 348/207.99, 207.1, 211.1, 211.2, 348/211.3, 211.8, 211.13, 211.14; 368/10; 396/56, 318
See application file for complete search history.

(56) References Cited

U.S. PATENT DOCUMENTS

| | | | | |
|---|---|---|---|---|
| 6,288,800 | B1 | 9/2001 | Izumi ......................... | 358/468 |
| 6,313,877 | B1* | 11/2001 | Anderson ............... | 348/333.05 |
| 6,809,759 | B1* | 10/2004 | Chiang .................... | 348/211.2 |
| 2001/0041056 | A1* | 11/2001 | Tanaka et al. ................ | 386/95 |
| 2002/0051181 | A1* | 5/2002 | Nishimura .................. | 358/1.15 |

FOREIGN PATENT DOCUMENTS

| | | |
|---|---|---|
| EP | 0 833 494 | 4/1998 |
| EP | 0 930 757 | 7/1999 |
| EP | 0 936 808 | 8/1999 |
| EP | 0 991 260 | 4/2000 |
| JP | 06-189105 A | 7/1994 |
| JP | 06-233044 A | 8/1994 |
| JP | 11-8823 | 8/1994 |
| JP | 2001-016568 A | 1/2001 |
| WO | 99/17529 | 4/1999 |

OTHER PUBLICATIONS

Full Machine Translation of JP 06-233044 (Tanaka et al.), 1994.*

* cited by examiner

*Primary Examiner*—Lin Ye
*Assistant Examiner*—Dillon Durnford-Geszvain
(74) *Attorney, Agent, or Firm*—Fitzpatrick, Cella, Harper & Scinto (57) ABSTRACT

Based on image list information received from an image storage device (image device), an image display device (portable terminal) counts the number of images held by the image storage device, determines the type of data to be received, and requests from the image display device the data for the determined type. When the file names of multiple image files are received from the image storage device, the image display device displays these file names, and requests, from the image storage device, the images for file names selected by a user. The image display device thereafter transmits, to a public network, images that are received from the image storage device in response to the request.

37 Claims, 9 Drawing Sheets

IMAGE INFORMATION FORMAT
OF IMAGE DEVICE 100

| FILE NAME |
|---|
| SHOOTING DATE |
| CAMERA TYPE |
| COMPRESSION IMAGE DATA |

IMAGE TRANSFER SYSTEM AND DISPLAY METHOD IN WHICH A STORED IMAGE IS TRANSFERRED TO AN IMAGE DISPLAY DEVICE

BACKGROUND OF THE INVENTION

1. Field of the Invention

The present invention relates to an image transfer system for displaying on an image display device an image stored in an image storage device.

2. Related Background Art

In Japanese Patent application Laid-Open No. 11-008823, a method is proposed whereby, using IrDA (infrared communication) or a PHS, control information, status information and image data are exchanged by a portable terminal (image display device) and an electronic image device (image storage device), and the electronic image device is controlled by a portable terminal.

However, since between a portable terminal and an electronic image device operating information, the size of the liquid crystal screen on which an image is displayed, the resolution, and the number and types of operating buttons differ, an operation can not be satisfactorily improved even when the portable terminal controls the electronic image device by employing the control information and the status information held by the electronic image device.

SUMMARY OF THE INVENTION

It is one objective of the present invention to improve the operability of an image display device.

According to one aspect of the present invention, there is provided an image display method in which a determination is made as to whether an image stored in an image storage device, or characters related to the image, displayed, in accordance with the number of images stored in the image storage device. The characters may in particular be the name of the image.

In another aspect of the invention, there is provided a method for transmitting image data from an image storage device to an image reception device. A determination is made as to whether image data is to be transmitted or identification of the image data is to be transmitted by the image storage device to the image display device, in accordance with the number of images stored in the image storage device.

Other, obvious objectives of the present invention will become apparent during the course of the subsequent explanation given for the embodiments.

DETAILED DESCRIPTION OF THE PREFERRED EMBODIMENTS

Figure 1:
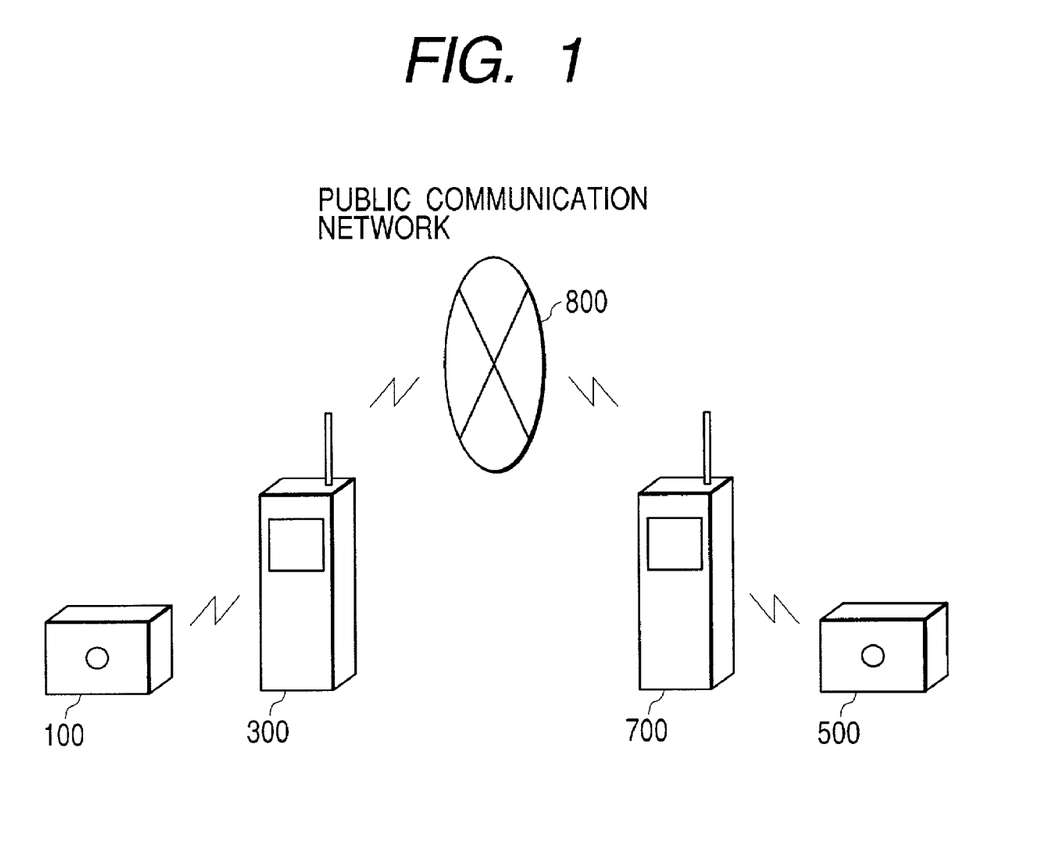
FIG. 1 is a diagram showing the general configuration of an image transfer system according to one embodiment of the present invention.

FIG. 1 is a diagram showing the general configuration of an image transfer system according to the embodiment of the present invention.

An image device (image storage device) 100 and a portable terminal (image display device) 300 can mutually exchange data, including commands and obtained images, using wireless spectrum diffusion communication, such as communication based on the Bluetooth standards. Similarly, an image device 500 and a portable terminal 700 can exchange data, including commands and obtained images. Further, the portable terminals 300 and 700 can communicate via a wireless public communication network 800. Further, the image devices 100 and 500 can be connected via the portable terminals 300 and 700.

Figure 2:
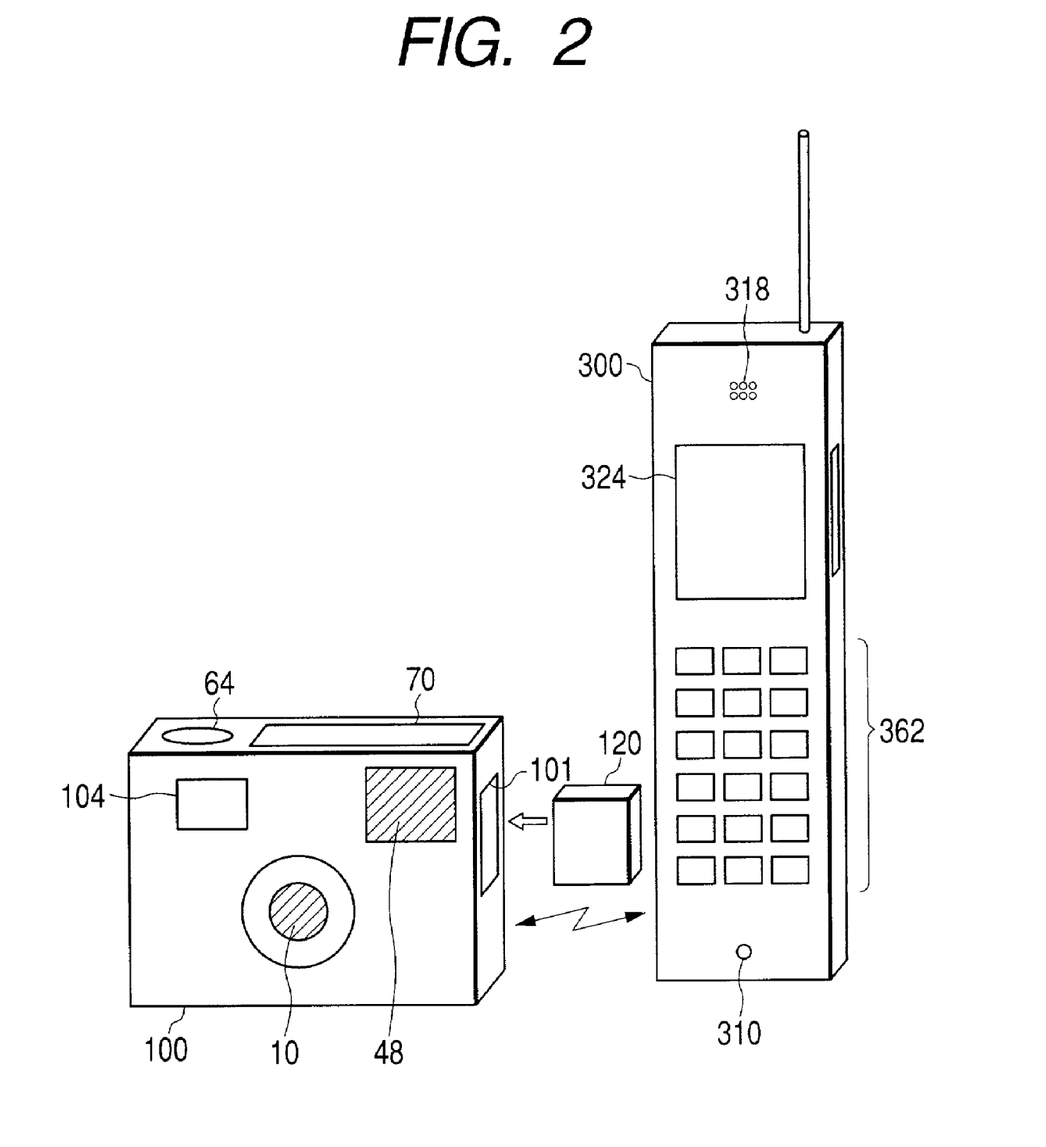
FIG. 2 is a diagram showing the external arrangement of an image device 100 and a portable terminal 300.

FIG. 2 is a diagram showing the external arrangement of the image device 100 and that of the portable terminal 300.

For the image device 100, a flash 48, a mode dial switch 60, a shutter button 64, an operation unit 70, an optical finder 104, and an image lens 10 are provided at appropriate locations.

And for the portable terminal 300, a microphone 310, a loudspeaker 318, a display unit 324 and an operation unit 362 are provided at appropriate locations.

Further, the image device 100 includes a slot 101, into which a recording medium 120 can be loaded.

Since the external arrangement of the image device 500 and that of the portable terminal 700 are the same as those of the image device 100 and the portable terminal 300, no further explanation for them will be given. Similarly, since the internal electric arrangement of the image device 500 and that of the portable terminal 700 are the same as those of the image device 100 and the portable terminal 300, which will be described later, no further explanation for them will be given.

Figure 3:
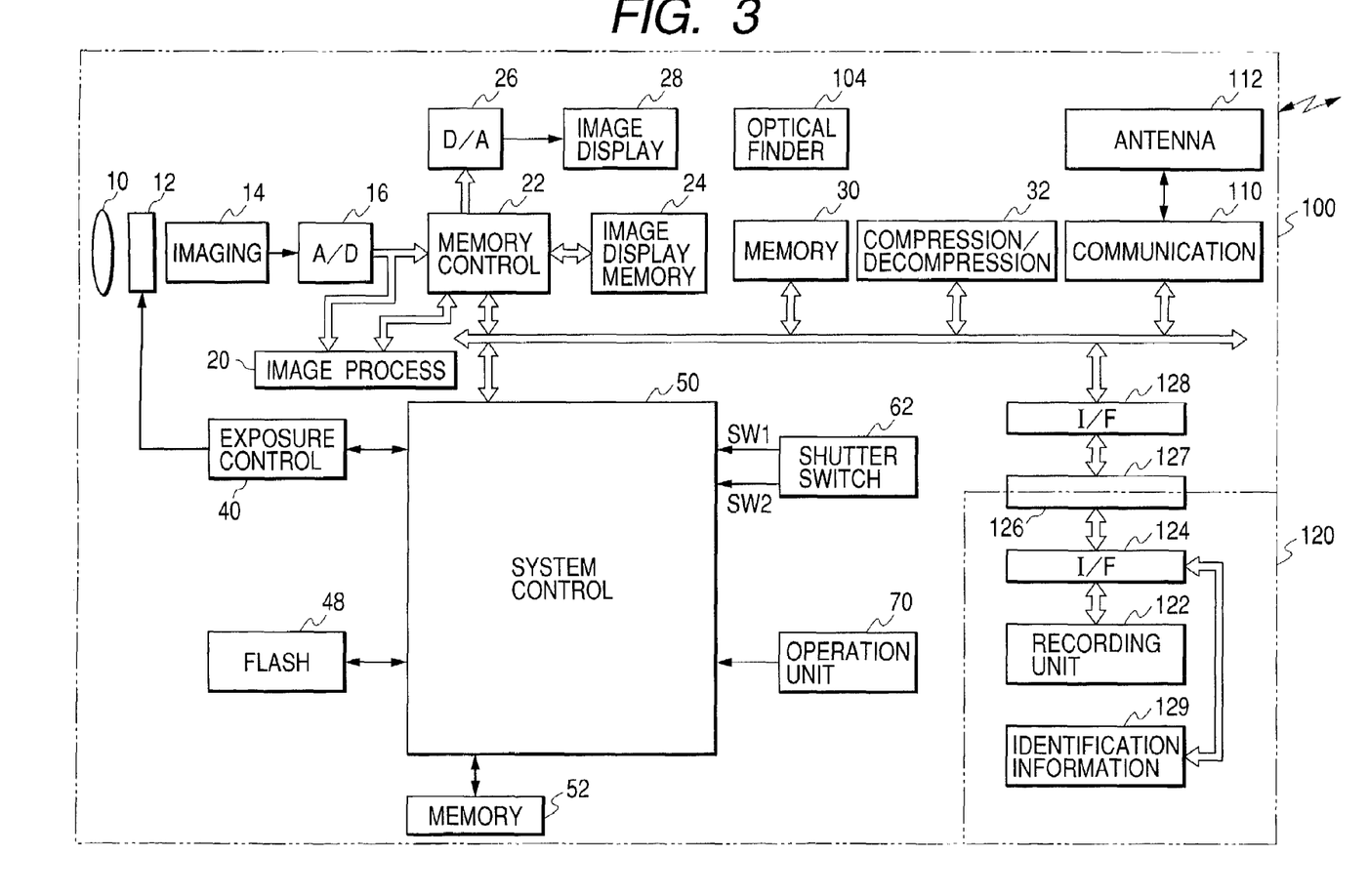
FIG. 3 is a block diagram showing the internal electric arrangement of the image device 100.

FIG. 3 is a block diagram showing the internal electric arrangement of the image device 100.

For the image device 100, the image lens 10 is used to obtain an optical image of an object, while adjacent to the shutter 12, which has an included aperture function, is an image element 14 that converts the optical image fetched through the image lens 10 into an analog signal and outputs the signal to an A/D converter 16 that converts it into a digital signal.

An image processor 20 performs predetermined pixel interpolation and color conversion processes for the data received from the A/D converter 16 or for data obtained from a memory controller 22.

The data output by the A/D converter is written in an image display memory 24 or a memory 30 via the image processor 20 and a memory controller 22, or is written directly via the memory controller 22.

An image display unit 28 is constituted by, for example, a TFT liquid crystal display device (LCD) to which, via a D/A converter 26, the image data written in the image display memory 24 are transmitted for display.

The memory 30, for storing both a static image and an animated image that are obtained, is constituted by a volatile memory and/or a nonvolatile memory, and has sufficient storage capacity to store a predetermined number of static images and animated pictures representing a predetermined period of time. The memory 30 can also be used as a working area for a system controller 50.

An exposure controller 40 controls the shutter 12 having the aperture function, and provides a flashlight adjustment function while interacting with the flash 48.

Further, the system controller 50 controls the entire image device 100. And a memory 52 is used to store constants, variables and programs for the operation of the system controller 50.

The operation unit 70 is used to enter various operating instructions for the system controller 50, and is also employed for designating the power ON/OFF state and certain function modes, such as an image mode, a reproduction mode and a PC (Personal Computer) connection mode.

A shutter switch 62 is set ON by manipulating a shutter button 64, which is also used to instruct the start of an operating sequence, such as an exposure process, based on a signal read from the image element 14, for writing image data to the memory 30 via the A/D converter 16 and the memory controller 22, a development process for employing the computations performed by the image processor 20 and the memory controller 22, a process for reading image data from the memory 30, a compression process performed by a compression/decompression circuit 32, and a recording process for writing image data on the recording medium 200.

The optical finder 104 has an included image pickup operation, which is activated and performed without requiring the use of the digital finder function of the image display unit 28.

A communication unit 110 includes various short-distance, fast data transmission functions using spectrum diffusion communication means, such as is represented by Bluetooth. An antenna 112 is used to permit the communication unit 110 to connect the image device 100 with another device.

An interface 128 serves as an interface with a recording medium, such as a memory card or a hard disk. And a connector 127 is used as a connection with a recording medium, such as a memory card or a hard disk.

When an interface 128 and a connector 127 that conform to the PCMCIA card standards or a CF card is employed, upon the connection of a communication card, such as a LAN card, a modem card, a USB card, an IEEE (Institute of Electrical and Electronic Engineers) 1394 card, a P1284 card, a SCSI (Small Computer System Interface) card or a PHS, image data and management information belonging to the image data can be exchanged with a peripheral device, such as another computer and a printer, without having to use the communication unit 110.

The recording medium 120 is constituted by a memory card or a hard disk, and includes a recording unit 122, which is a semiconductor memory or a magnetic disk; an interface 124 used for the image device 100; a connector 126 used for a connection with the image device 10; and an identification information unit 129.

Figure 4:
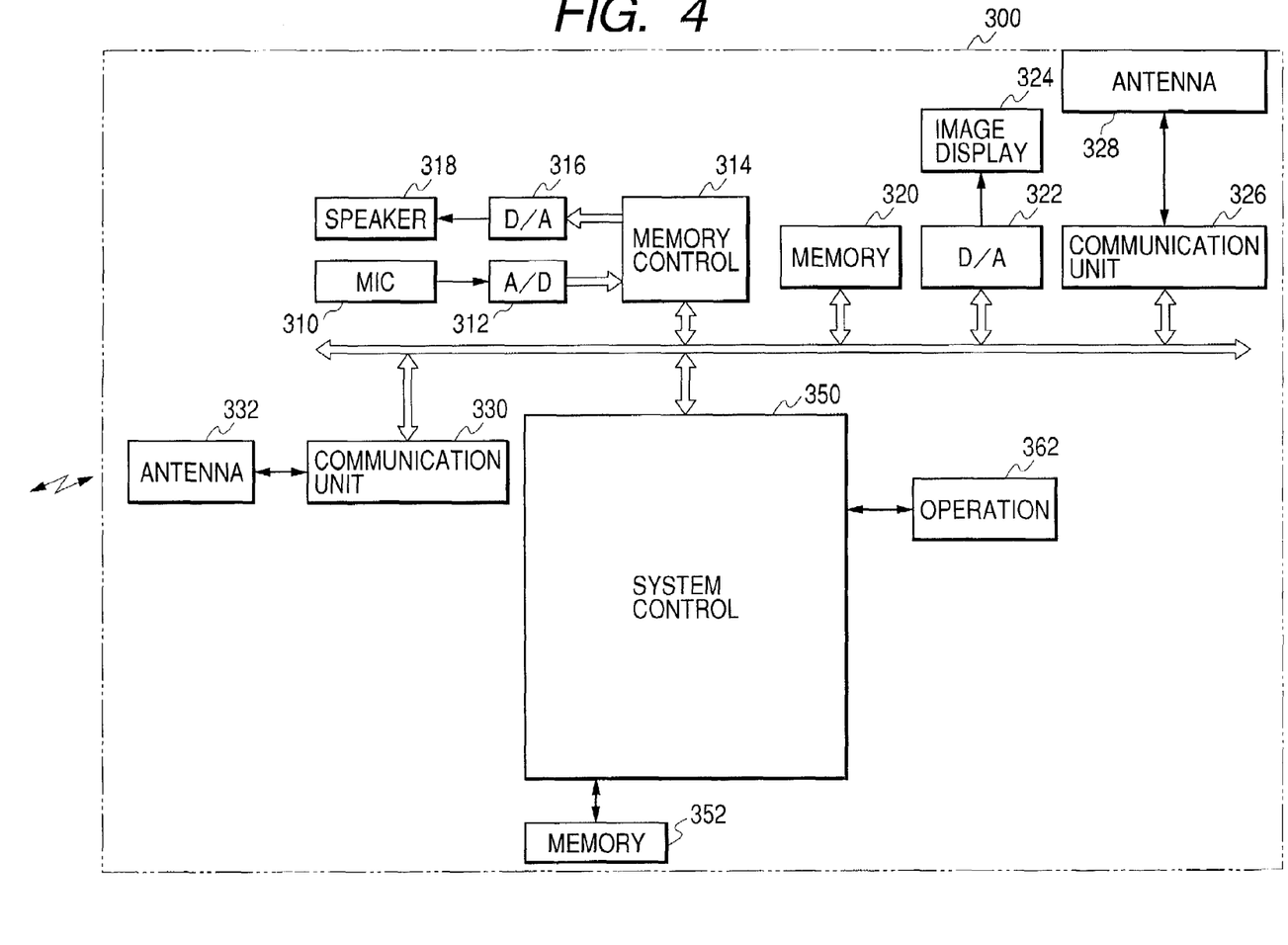
FIG. 4 is a block diagram showing the internal electric arrangement of the portable terminal 300.

FIG. 4 is a block diagram showing the internal electric structure of the portable terminal 300.

The microphone 310 is used to convert sound into an electric signal. The A/D converter 312, at the microphone 310, converts an analog signal input into a digital signal. The memory controller 314 writes the data output by the A/D converter 312 in the memory 320, and reads data from the memory 320 that it transmits to the D/A converter 316.

The D/A converter 316 converts a digital signal into an analog signal. The loudspeaker 318 converts an electric signal into a digital signal. The memory 320 is used to store sound input at the microphone 310 and/or static or animated images that are transmitted by the image device 100. And the capacity of the memory 320 is adequate for the storage of sound released for a predetermined period of time, and/or a predetermined number of static images and animated images representing a predetermined period of time.

The D/A converter 322 converts into analog signals the static image and animated image data stored in the memory 320, and the image display unit 324 displays an image signal output by the D/A converter 322.

A communication unit 326 includes various long-distance wireless communication functions, such as TDMA (Time Division Multiple Access), CDMA (Code Division Multiple Access), and W-CDMA (Wide-band code Division Multiple Access), while an antenna 328 permits the communication unit 326 to establish communication between the portable terminal 300 and the base station of the public communication network 800.

A communication unit 330 includes various short-distance, fast data communication functions for spectrum diffusion communication, such as is represented by Bluetooth, while an antenna 332 permits the communication unit 330 to establish communication between the portable terminal 300 and another device.

A communication system controller 350 controls the entire portable terminal 300. And a memory 352 is used to store constants, variables and programs for the operation of the communication system controller 350.

An operation unit 362 used to supply various operating instructions to the communication system controller 350 is constituted by a switch, a dial, a touch panel, a pointing device based on line of sight or a voice recognition device, or a combination of these components. The operation unit 362 can be used to power on/off the portable terminal 300, to initiate (off-hook) or halt (on-hook) voice communication, to enter a telephone number, to search for a telephone number, and to change a communication mode.

Accordingly, while the system is active and functioning, the image device (image storage device) 100 obtains through the image lens 10 image data that it stores on the recording medium 120 and transmits, via the communication unit 110 and the antenna 112, to the portable terminal 300. And the portable terminal (image display device) 300 uses the display unit 324 to display the image data as they are received, via the antenna 332 and the communication unit 330, and records them in the memory 326. Concurrently, via the communication unit 326 and the antenna 328, the portable terminal 300 transmits the image data to the portable terminal 700, which is connected to the public communication network 800 and thence to the image device 500, which is connected to the portable terminal 700.

The operation of an image transfer system having the above configuration will now be described.

Figure 5:
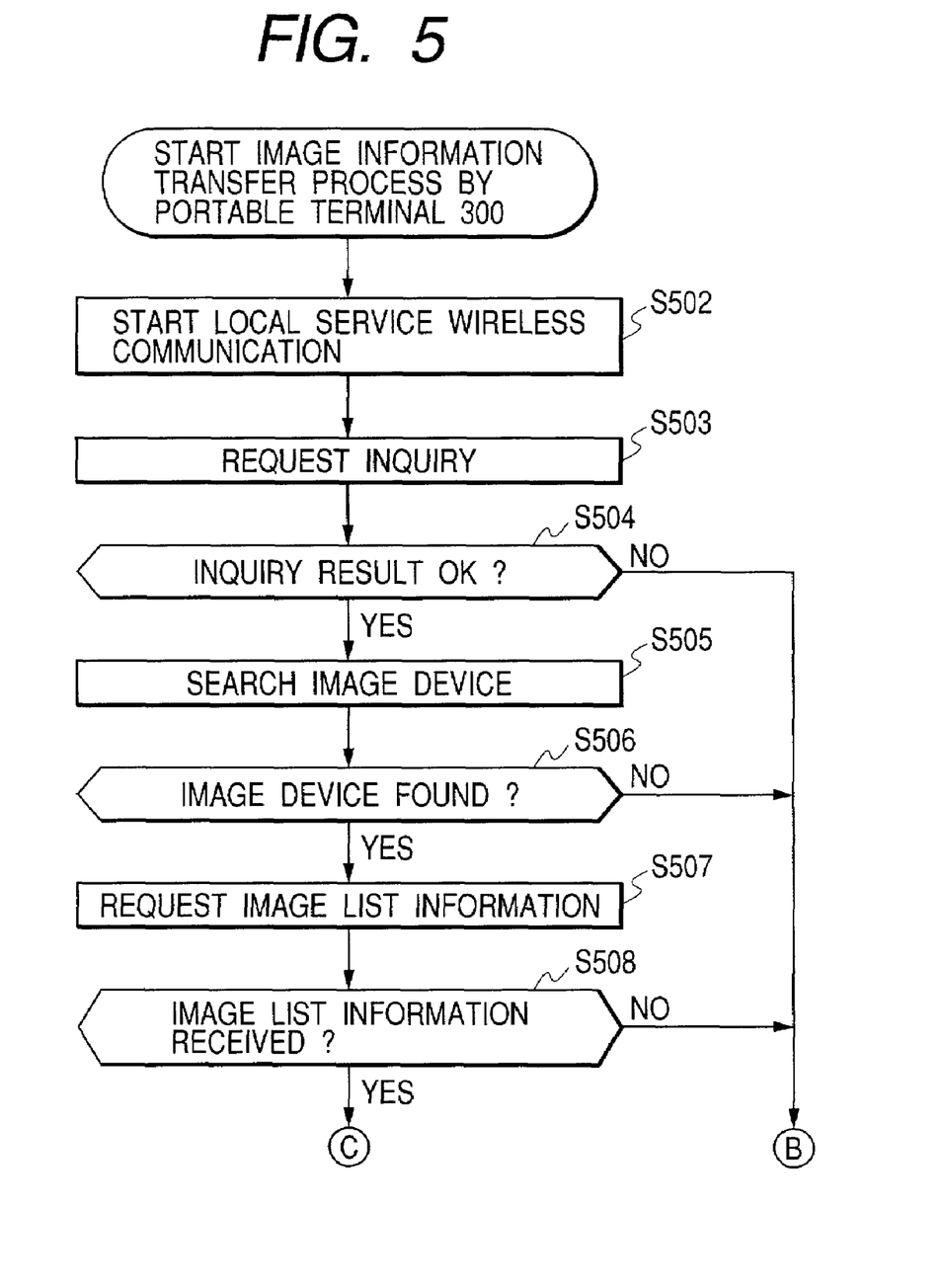
FIG. 5 is a flowchart showing the image transfer processing performed by the portable terminal 300.
Figure 6:
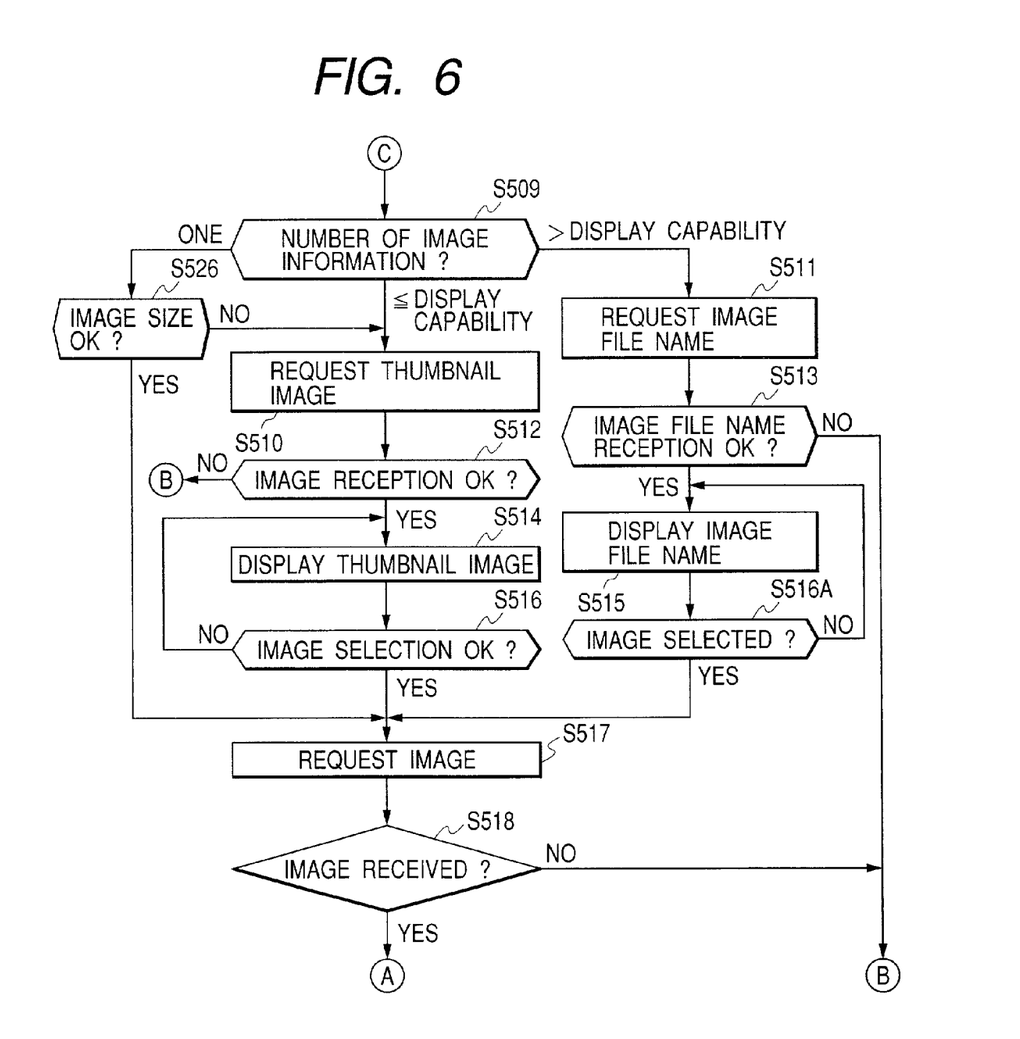
FIG. 6 is a flowchart showing the image transfer processing performed by the portable terminal 300 in FIG. 5.
Figure 7:
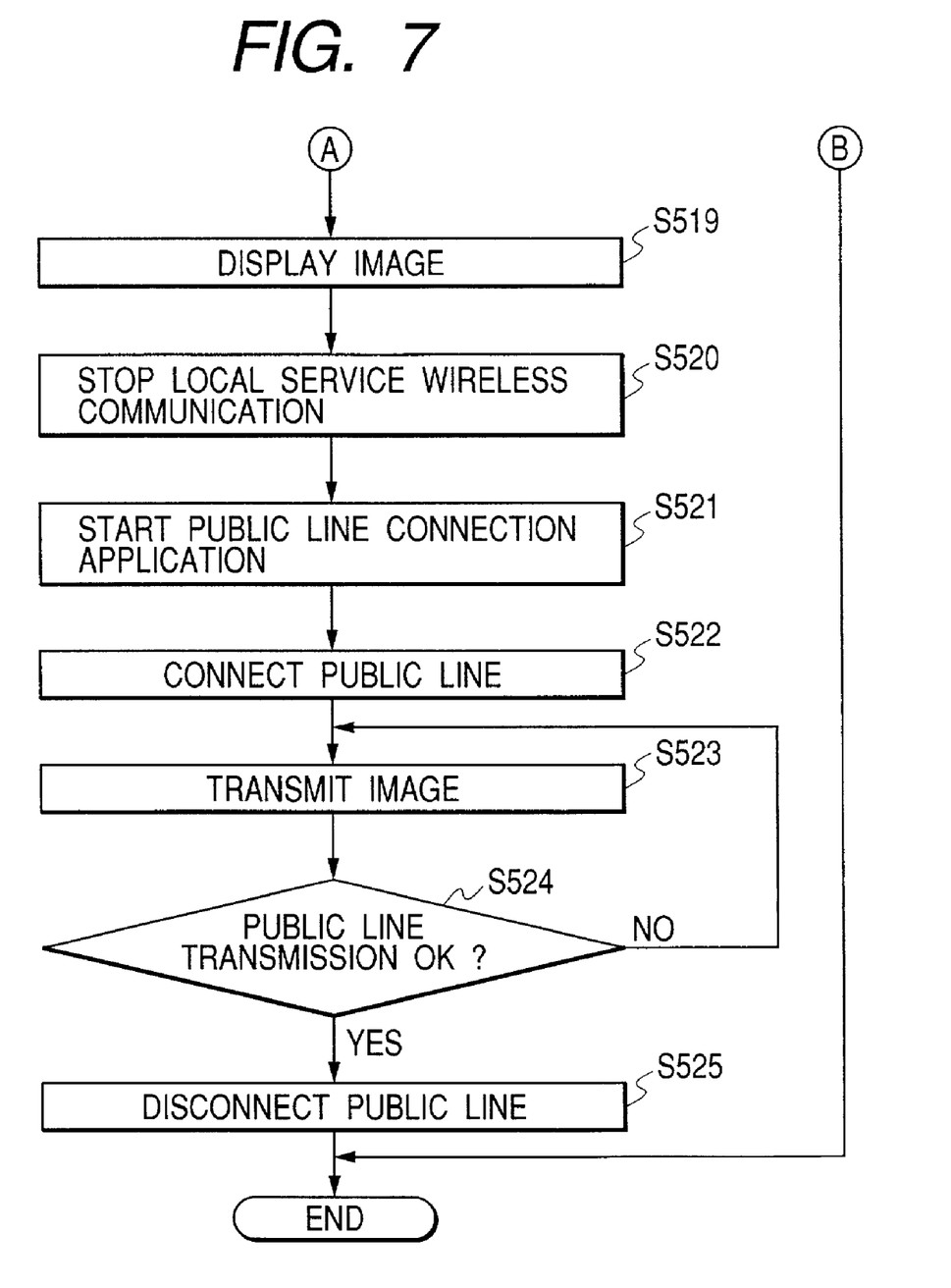
FIG. 7 is a flowchart showing the image transfer processing performed by the portable terminal 300 in FIG. 6.

FIGS. 5 to 7 are flowcharts showing the image transfer processing performed by the portable terminal (image display device) 300. The program for performing this processing is stored in the memory 352, and is executed by a CPU in the communication system controller 350. The communication system controller 350 is a computer that reads the program from the memory 352, which is a storage medium and performs the operations that follow. The memory 352 in which the program is stored is a storage medium that the communication system controller 352 read. This program may be received from the communication unit 326 or 330 and stored in the memory 352.

First, when the operation unit 362 is manipulated and performance of the image transfer process is instructed, the communication unit 330 is controlled and initiates local wireless communication, such as Bluetooth, between the portable terminal 300 and the image device 100 (step S502). Then, the communication unit 330 outputs an inquiry to determine whether there is an image device 100 on the periphery that can communicate with the portable terminal 300 (step S503).

The communication unit 330 examines the results obtained by the inquiry (step S504). If the results are not "OK", the processing is terminated. When the result, however is "OK", and one or more available communication image devices 100 are found, a pertinent image device 100 is searched for (step S505). This search is performed by comparing the addresses of the image devices stored in the memory 352 with the address of one or more available communication image devices 100. Either this process is used or a search is performed by displaying a list of available image devices 100 on the display unit 360 for the selection by a user of an appropriate one.

Then, a check is performed to determine whether a suitable image device 100 has been found that can be used to communicate with the portable terminal 300 (step S506). When no suitable image device is found, the processing is terminated. When, however, a suitable image device 100 is found, the communication unit 330 is employed to establish a connection with the selected image device 100 using a local wireless communication system, such as Bluetooth, and an image list information request is transmitted to obtain information for one or more of the multiple images that are stored in the memory 30 of the image device 100 (step S507).

A check is then performed to determine whether image list information has been received in response to the image list information request (step S508). When no image list information has been received, the processing is terminated. When, however, the communication unit 330 has received image list information, the portable terminal 300 employs that information to obtain a count of the images stored in the memory 30 of the image device 100 and the number of available image information sets (step S509).

Image list information includes the image file names and their sizes stored in the memory 30 of the image device 100, and the number of images stored in the memory 30 of the image device 100 can be obtained by counting the number of image files, for example.

It should be noted that instead of the image list information, the portable terminal 300 may receive data expressing the number of images from the image device 100.

When, as a count result, it is found that only one image is stored in the image device 100, the image size (pixel count) of the image list information and the display resolution (pixel count) of the image display unit 324 are employed to determine whether the image can be displayed on the image display unit 324 of the portable terminal 300 (step S526). Since the display resolution for the image display unit 324 is stored in the memory 352, this display resolution is employed by the portable terminal 300 to determine whether the image can be displayed. When an image display is not available, program control is shifted to step S510, but when on is available, the communication unit 330 transmits an image request to the image device 100 (step S517).

When, at step S509, the image count is equal to or less than the image display capacity of the portable terminal 300 (e.g., the number of images is equal to or less than four), or when an image display is not available at step S526, the communication unit 330 transmits a thumbnail image request to the image device 100 (step S510). In one mode, multiple thumbnail image requests are issued for the individual stored images, and in another mode, a single thumbnail image request is issued for all the images stored in the memory 30.

A check is performed to determine whether the thumbnail image can be received from the image device 100 (step S512). When the thumbnail image can not be received, the processing is terminated, but when the communication unit 330 can receive the thumbnail image, a plurality of thumbnail images are displayed on the image display unit 324 (step S514), and a user is permitted to select one of them. Subsequently, a check is performed to determine whether the user has selected an image (step S516), and when the user has selected an image using the operation unit 326, a request for the selected image is transmitted by the communication unit 330 to the image device 100 (step S517).

When, as a result of the count performed at step S509, a plurality of images are stored in the image device 100, and when the total size of the stored thumbnail images exceeds the image resolution of the image display unit 324 (e.g., the number of images exceeds four), the communication unit 330 issues an image file name request to the image device 100 (step S511). In another mode, the image file name obtained from the image list information is displayed as a character, and in this case, a new image file name request is transmitted to the image device 100. In a specific mode, multiple image file name requests are transmitted for the individual stored images, while in another mode, a single image file name request is issued for all the images stored in the memory 30.

A check is performed to determine whether the image file name can be received from the image device 100 (step S513). When the image file name can not be received, the processing is terminated, but when the communication unit 330 can receive the image file name, a list of multiple image files is displayed on the image display unit 324 and the user is permitted to select one of them (step S515). A check is then performed to determine whether the user has selected an image (step S516A), and when one has been selected using the operation unit 362, the communication unit 330 transmits an image request to the image device 100 (step S517).

In this embodiment, at step S509 there are three program control branches: for a full image, for a thumbnail image and for an image file image. However, the branch from S509 to S526 may be eliminated, and there may be only two program control branches: for a thumbnail image and for an image file name. Further, at step S509 image size is taken into account. In the event, however, while only the number of images is taken into account (by determining whether the number of images is equal to or smaller or greater than four), program control may advance to either step S510 or S511.

Figure 9:
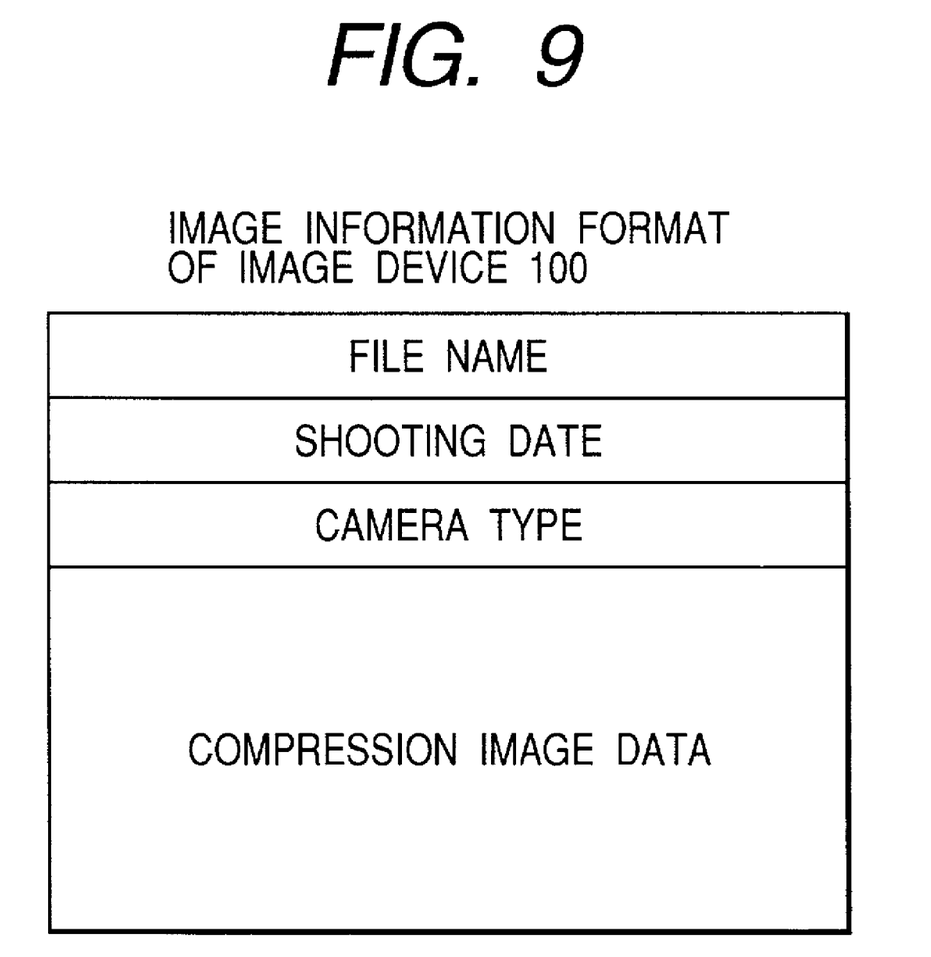
FIG. 9 is a diagram showing the format of image data for the image device 100.

At step S517, not only an image, but also image data, such as that contained in the image information format shown in FIG. 9, may be requested.

FIG. 9 is a diagram showing the image information format used for the image device 100. The image data shown includes a file name, a shooting date, the model name of the image device that was used and image data. Further, when an image device can automatically identify a shooting location based on GPS (Global Positioning System) positioning information or when positioning information can be acquired by referring to the position of a base station constituting the wireless communication source for a public network, when position information can be input by using the operation unit, or when the shooting location can be input as the keyword for an obtained image, these data may be included in the image information.

The portable terminal 300 determines whether an image corresponding to the request (or the image and image information when such information is included) has been received (step S518). When the communication unit 330 receives an image (a full image), this image (or the image and the image information when it is included) is displayed on the image display unit 324 and is stored in the memory 320 (step S519).

When the display and storage processes are completed for the portable terminal 300, the local wireless communication performed by the communication unit 330 is halted (step S520). In this case, in order to save battery power the portable terminal 300 halts the local wireless communication; however, when AC power is employed, the local wireless communication may not be halted and the connection state may be constantly maintained.

Further, an application for a connection to the public network is activated (step S521), and when the operation is performed by the manipulation of the operation unit 362 of the portable terminal 300 in accordance with an instruction issued by the application, the communication unit 326 is used to establish a dial-up access connection with the destination along the public network, and a response from the recipient destination is waited for. When a response is transmitted by the recipient to the communication unit 326, the communication unit 326 initiates the connection process (step S522).

Then, when the connection process has been completed, the image and the image information stored in the memory 320 are transmitted by the communication unit 326 to the public network (step S523) Thereafter, the communication unit 326 employs a communication protocol, such as PPP or TCP/IP, to transmit the image and the image information, and then waits for the transmission of a transmission OK response by the connection destination (step S524). When the transmission OK response is received by the communication unit 326, the communication unit 326 is disconnected from the public network (step S525) and the processing is thereafter terminated.

Figure 8:
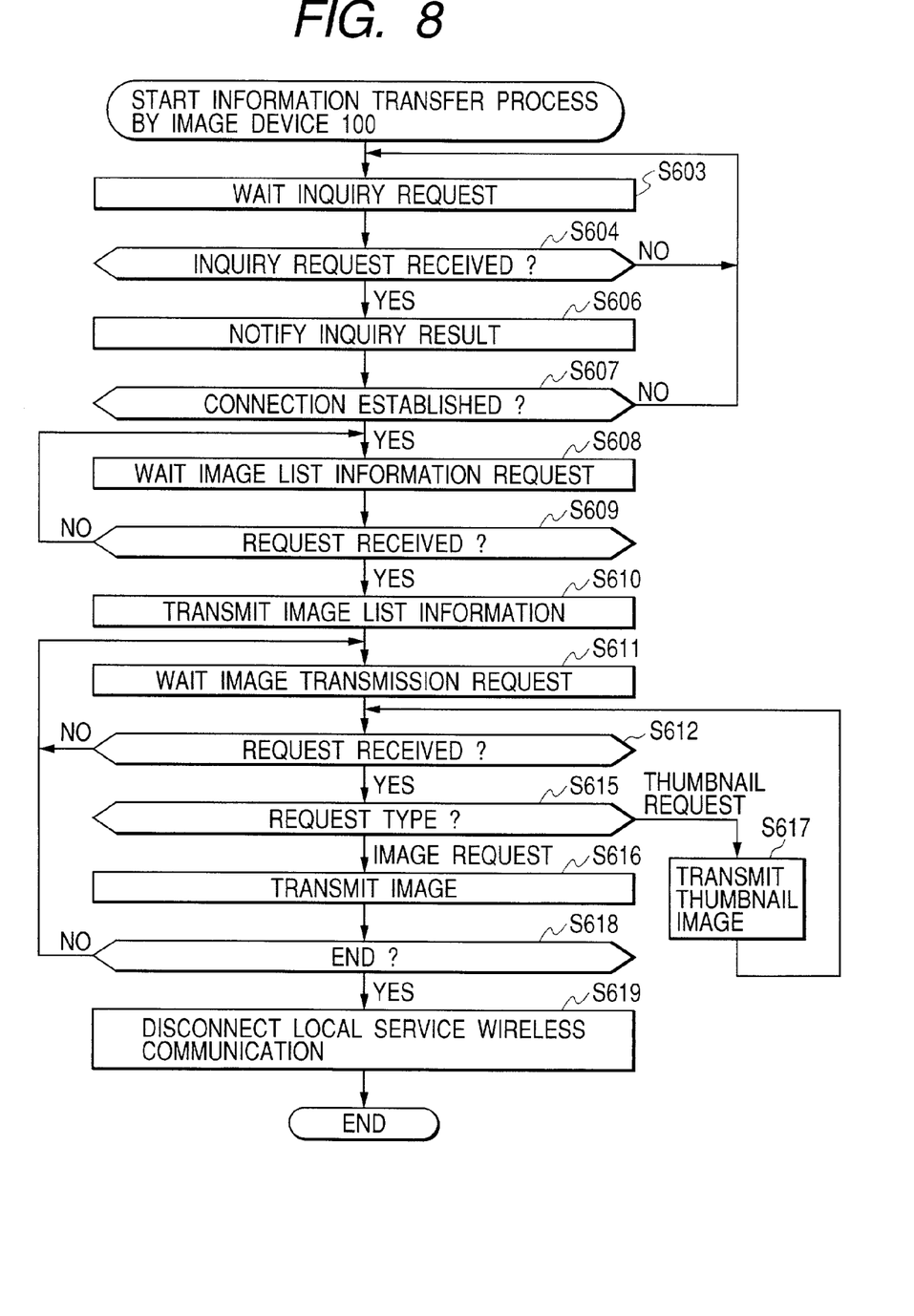
FIG. 8 is a flowchart showing the image transfer processing performed by the image device 100.

FIG. 8 is a flowchart showing the image transfer processing performed by the image device 100 when a program stored in the memory 52 is read and executed by the system controller 50, constituted by a CPU. The system controller 50, which is a computer and which reads the program from the memory 52, performs the operations that follow, while the memory 52 in which the program is stored is a storage medium that is available to and can be accessed by the system controller 50. In this case, the program may be received by the communication unit 110 and stored in the memory 52.

After the information transfer mode has been set, by the manipulation of the operation unit 70, the image device 100 waits for an inquiry requesting a search for a peripheral portable terminal 300 that it can communicate with (step S603). The image device 100 determines whether an inquiry request has been received in the request waiting state (step S604), and when no inquiry request has been received, program control returns to step S603.

When in this case, however, the communication unit 110 has received an inquiry request, a local wireless communication system, such as Bluetooth, is activated to establish communication between the portable terminal 300 and the image device 100, and the communication unit 110 transmits the results obtained for the inquiry to the portable terminal 300 (step S606).

A check is also performed to determine whether a connection with the portable terminal 300 has been established (step S607), and when no connection has been established, program control returns to step S603. However, if the communication unit 110 has established a connection and communication with the portable terminal 300 is available, the image device 100 is set to a state wherein an image list information request from the portable terminal 300 is waited for (step S608). This state is maintained until an image list information request is received (step S609).

When the communication unit 110 receives an image list information request, one or all of the image list information sets stored in the memory 30 (or on the recording medium 120), e.g., image list information having the format shown in FIG. 9, are transmitted by the communication unit 110 to the portable terminal 300 (step S610).

Following this, the image device 100 is set to a state wherein it waits to receive an image request from the portable terminal 300 (step S611), and is maintained in this state until an image request is received (step S612). Then, when the communication unit 110 receives an image request, the request type is determined (step S615), and when it is an image request, the image (the full image) stored in the memory 30 (or on the recording medium 120) is transmitted by the communication unit 110 (step S616).

If a thumbnail image request type is received, the thumbnail image stored in the memory 30 (or on the recording medium 120) is transmitted by the communication unit 110 (step S617), and thereafter, program control is returned to step S612 where another image request is waited for. At this time, if at step S615 the request is an image file name type, at step S617, instead of a thumbnail image, or together with a thumbnail image, image information (see FIG. 9) in which the image file name is included is transmitted to the portable terminal 300.

A check is then performed to determine whether the transmission of the requested image has been completed (step S618). When the image transmission has been completed, the communication unit 110 halts the local wireless communication process (step S619) and the processing is thereafter terminated.

As is described above, based on image list information received from the image storage device (image device 100), the image display device (portable terminal 300) counts the images held by the image storage device and determines which type of data is to be received (step S509), and then requests that the image display device transmit data of the type determined. Subsequently, if multiple image file names are received from the image storage device, the image display device displays the names of these image files (step S515), and requests from the image storage device an image having a file name that is selected by a user (step S517). The image display device thereafter transmits to the public network the image received from the image storage device in response to the request (step S524).

Other Embodiments

One embodiment of the present invention has been explained. However, the present invention is not limited to this embodiment, and can be applied for any configuration so long as the functions cited in the claims of the invention or the functions described in the embodiment explanation are implemented.

In the preceding embodiment the portable terminal 300 counts the number of images based on image list information received from the image device 100, and transmits the type of a image requested to the image device 100. In a second embodiment, from an inquiry request received at step S604 in FIG. 8, the image device 100 obtains the display resolution (pixel count) of the image display unit 324 of the portable terminal 300, and determines which type of image is to be transmitted to the portable terminal 300 by comparing the pixel count stored in the memory 30 (or on the recording medium 120) with the display resolution (pixel count) for the image display unit 324 of the portable terminal 300. That is, in the second embodiment, the image device 100 performs a determination at steps S509 and S526 in FIG. 6, and in accordance with the determination, a full image, a thumbnail image, or an image file is transmitted by the communication unit 110 to the portable terminal 300.

As one modification, at step S509 the image device 100 determines whether the number of images is equal to or smaller than a predetermined count (e.g., four). When the number of images is equal to or smaller than the predetermined count, a thumbnail image is transmitted to the portable terminal 300. And when the number of images is greater than the predetermined count, the image file name is transmitted to the portable terminal 300. Further, at step S509, while not taking the image size into account and while taking only the number of images into account (e.g., by determining whether the images count is equal to or smaller than four, or is greater than four), either a thumbnail image or an image file name may be selected for transmission to the portable terminal 300.

In the previous embodiment, the image device 100 transmitted all the requested thumbnail images to the portable terminal 300. In a third embodiment, however, when multiple images are present in the memory 30 (or on the recording medium 120) of the image device 100, thumbnail images for these images are created by the image device 100, and are transmitted by the communication unit 110 to the portable terminal 300, by adding file names (file numbers provided when images having a reduced size are created, or file names provided for image information corresponding to the reduced images) to the thumbnail images. In the portable terminal 300, the communication unit 330 receives these thumbnail images and displays then as a list on the display unit 324.

When a user reads the list and selects one or more thumbnail images, the communication unit 330 transmits the file names of the selected thumbnail images to the image device 100. Thereafter, the communication unit 110 in the image device 100 transmits to the portable terminal 300 information for the original sized images that corresponds to the file names for the thumbnail images received by the communication unit 110. At this time, if only one image is stored in the memory 30, image information for the original size may be transmitted instead of a thumbnail image.

Further, the present invention can be applied for a mode wherein a program is supplied to an apparatus by using a storage medium whereon program code for software that implements the functions of the embodiments is stored. In this mode, the program code read from the storage medium can carry out the functions of the invention, and the program and the storage medium on which the program is stored constitute the present invention.

In the embodiments, the program code shown in the flowcharts in FIGS. 5 to 8 is stored in the ROM that constitutes a storage medium. The storage medium for supplying the program code can be not only a ROM, but also, for example, a floppy disk, a DVD or a nonvolatile memory card.

What is claimed is:

1. A method for displaying on an image display device an image stored in an image storage device comprising:
    an information obtaining step of obtaining a display capability of the image display device and a number of images stored in the image storage device; and
    a display determination step of determining whether an image is to be displayed or characters related to the image are to be displayed, in accordance with the display capability of the image display device and the number of images stored in the image storage device.

2. A method according to claim 1, wherein whether an image or a thumbnail image is to be displayed is determined in said display determination step, and wherein said display determination step includes:
    a thumbnail image display step of displaying a plurality of thumbnail images; and
    a full image display step of displaying an image corresponding to one of the displayed thumbnail images.

3. A method according to claim 1, wherein said information obtaining step comprises a receiving step of receiving a list of images from the image storage device, and includes determining the number of the images based on the list of images.

4. A method according to claim 1, wherein said display determination step comprises a request step of requesting, from the image storage device, the image which it is determined is to be displayed.

5. A method for displaying on an image display device, an image stored in an image storage device, comprising:
    an information obtaining step of obtaining a display capability of the image display device and a number of images stored in the image storage device; and
    a display determination step of determining whether an image is to be displayed or the name of an image is to be displayed, in accordance with the display capability of the image display device and the number of images stored in the image storage device.

6. A method according to claim 5, wherein said display determination step includes:
    a name display step of displaying names of multiple images; and
    an image display step of displaying one of the multiple images whose names are displayed.

7. A method according to claim 5, wherein said information obtaining step comprises a receiving step of receiving a list of images from the image storage device, and includes determining the number of the images based on the list of images.

8. A method according to claim 5, wherein said display determination step comprises a request step of requesting, from the image storage device, the image which it is determined is to be displayed.

9. A method for transmitting image data from an image storage device to an image reception device, comprising:
    an information obtaining step of obtaining a display capability of the image display device and a number of images stored in the image storage device; and
    a display determination step of determining whether image data is to be transmitted or identification of the image data is to be transmitted by the image storage device to the image display device, in accordance with the display capability of the image reception device and the number of images stored in the image storage device.

10. A method according to claim 9, further comprising:
a wireless transmission step of the image storage device transmitting, using wireless communication, the image data or characters related to the image data to the image reception device.

11. A method for transmitting image data from an image storage device to an image reception device, comprising:
an information obtaining step of obtaining a display capability of the image display device and a number of images stored in the image storage device; and
a display determination step of determining whether image data is to be transmitted or an image name is to be transmitted to the image reception device by the image storage device, in accordance with the display capability of the image reception device and the number of images stored in the image storage device.

12. A method according to claim 11, further comprising:
a display step of displaying multiple names that are transferred; and
a transmission step of transmitting from the image storage device to the image reception device image data in accordance with one of the displayed multiple names.

13. An image display device that is capable of displaying images stored in an image storage device, comprising:
display means; and
determination means for determining whether an image is to be displayed or characters related to the image are to be displayed on said display means, in accordance with a display capability of the image display device and a number of images stored in the image storage device.

14. An image display device according to claim 13, wherein said determination means determines whether an image or a thumbnail image is to be displayed, and wherein said display means displays multiple thumbnail images, and furthermore, displays an image that coffesponds to one of the thumbnail images.

15. An image display apparatus according to claim 13, wherein said determination means comprises receiving means for receiving a list of images from the image storage device, and said determination mean determines the number of the images based on the list of images.

16. An image display apparatus according to claim 13, wherein said determination means comprises request means for requesting, from the image storage device, the image which it is determined is to be displayed.

17. An image display device that is capable of displaying images stored in an image storage device, comprising:
display means; and
determination means for determining whether an image is to be displayed or the name of an image is to be displayed on said display means, in accordance with a display capability of the image display device and a number of images stored in the image storage device.

18. An image display apparatus according to claim 17, wherein said determination means comprises receiving means for receiving a list of images from the image storage device, and said determination means determines the number of the images based on the list of images.

19. An image display apparatus according to claim 17, wherein said determination means comprises request means for requesting, from the image storage device, the image which it is determined is to be displayed.

20. A program for an image display device that is capable of displaying an image stored in an image storage device, said program being stored in a computer-readable medium and comprising:
an information obtaining step of obtaining a display capability of the image display device and a number of images stored in the image storage device; and
a display determination step of determining whether an image is to be displayed or characters related to the image is to be displayed, in accordance with the display capability of the image display device and the number of image stored in the image storage device.

21. A program according to claim 20, wherein whether an image or a thumbnail image is to be displayed is determined in said display determination step, and wherein said display determination step further includes, responsive to determining whether an image or a thumbnail image is to be displayed:
a thumbnail image display step of displaying a plurality of thumbnail images; and
a full image display step of displaying an image corresponding to one of the displayed thumbnail images.

22. A program according to claim 20, wherein said information obtaining step comprises a receiving step of receiving a list of images from the image storage device, and includes determining the number of the images based on the list of images.

23. A program according to claim 20, wherein said display determination step comprises a request step of requesting, from the image storage device, the image which it is determined is to be displayed.

24. A program for an image display device that is capable of displaying an image stored in an image storage device, said program comprising:
an information obtaining step of obtaining a display capability of the image display device and a number of images stored in the image storage device; and
a display determination step of determining whether an image is to be displayed or the name of an image is to be displayed, in accordance with the display capability of the image display device and the number of images stored in the image storage device.

25. A program according to claim 24, further comprising:
an image display step of displaying an image whose name is displayed.

26. A program according to claim 24, wherein said information obtaining step comprises a receiving step of receiving a list of images from the image storage device, and includes determining the number of the images based on the list of images.

27. A program according to claim 24, wherein said display determination step comprises a request step of requesting, from the image storage device, the image which it is determined is to be displayed.

28. An image storage device for storing image data, comprising:
communication means for communicating with an image reception device; and
determination means for determining whether image data is to be transmitted or identification of the image data to be transmitted to the image reception device, in accordance with a display capability of the image display device and a number of images.

29. An image storage device for storing image data, comprising:
communication means for communicating with an image reception device; and determination means for determining whether image data is to be transmitted or an image name is to be transmitted to the image reception device, in accordance with a display capability of the image display device and a number of images stored in said image storage device.

30. A program for an image storage device that stores image data, said program being stored in a computer-readable storage medium and comprising:

an information obtaining step of obtaining a display capability of the image display device and a number of images stored in the image storage device; and a display determination step of determining whether image data is to be transmitted or an image name is to be transmitted to an image reception device by said image storage device in accordance with the display capability of the image display device and the number of images.

31. A program for an image storage device that stores image data, said program being stored in a computer-readable storage medium and comprising:

an information obtaining step of obtaining a display capability of the image display device and a number of images stored in the image storage device; and a display determination step of determining whether image data is to be transmitted or identification of the image data is to be transmitted to an image reception device by the image storage device, in accordance with the display capability of the image display device and the number of images.

32. A method for transmitting image data from an image storage device to an image reception device, comprising:

a reception step of receiving a request from the image reception device; and a transmission step of transmitting data of a kind corresponding to a display capability of the image reception device and a number of images stored in the image storage device to the image reception device.

33. A method according to claim 32, wherein said transmission step includes transmitting image data or identification data of the image data in accordance with the number of the images to the image reception device.

34. An image storage device comprising:

reception means for receiving a request from an image reception device; and transmission means for transmitting data of a kind corresponding to a display capability of the image reception device and a number of images stored in the image storage device to the image reception device.

35. An image storage device according to claim 34, wherein said transmission means transmits image data or identification data of the image data in accordance with the number of the images to the image reception device.

36. A program for an image storage device, comprising:

a reception step of receiving a request from an image reception device; and a transmission step of transmitting data of a kind corresponding to a display capability of the image reception device and a number of images stored in the image storage device to the image reception device.

37. A program according to claim 36, wherein said transmission step includes transmitting image data or identification data of the image data in accordance with the number of the images to the image reception device.

* * * * *

UNITED STATES PATENT AND TRADEMARK OFFICE
CERTIFICATE OF CORRECTION

| | |
|---|---|
| PATENT NO. | : 7,304,665 B2 |
| APPLICATION NO. | : 10/098545 |
| DATED | : December 4, 2007 |
| INVENTOR(S) | : Takumi Takahashi |

It is certified that error appears in the above-identified patent and that said Letters Patent is hereby corrected as shown below:

ON TITLE PAGE AT (56) FOREIGN PATENT DOCUMENTS

"JP 11-8823 8/1994" should read --JP 11-8823 1/1999--.

COLUMN 1

Line 36, "image," should read --image, is--.

COLUMN 3

Line 59, "device 10;" should read --device 100;--.

COLUMN 5

Line 1, "controller 352" should read --controller 350 can--; and
Line 66, "on" should read --one--.

COLUMN 9

Line 31, "images" should read --image--; and
Line 47, "then" should read --them--.

COLUMN 11

Line 39, "coffesponds" should read --corresponds--; and
Line 44, "mean" should read --means--.

UNITED STATES PATENT AND TRADEMARK OFFICE
CERTIFICATE OF CORRECTION

PATENT NO. : 7,304,665 B2
APPLICATION NO. : 10/098545
DATED : December 4, 2007
INVENTOR(S) : Takumi Takahashi It is certified that error appears in the above-identified patent and that said Letters Patent is hereby corrected as shown below:

COLUMN 12

Line 10, "is" should read --are--;
    Line 12, "image" (first occurrence) should read --images--; and
    Line 60, "data" should read --data is--.

Signed and Sealed this

Sixteenth Day of September, 2008

JON W. DUDAS
*Director of the United States Patent and Trademark Office*